May 19, 1953 J. H. OLSON 2,639,173
ARTICULATED TRUCK FOR RAILWAY CARS
Filed May 29, 1951 2 Sheets-Sheet 1

INVENTOR.
Johan H. Olson
BY
Robert Henderson
ATTORNEY.

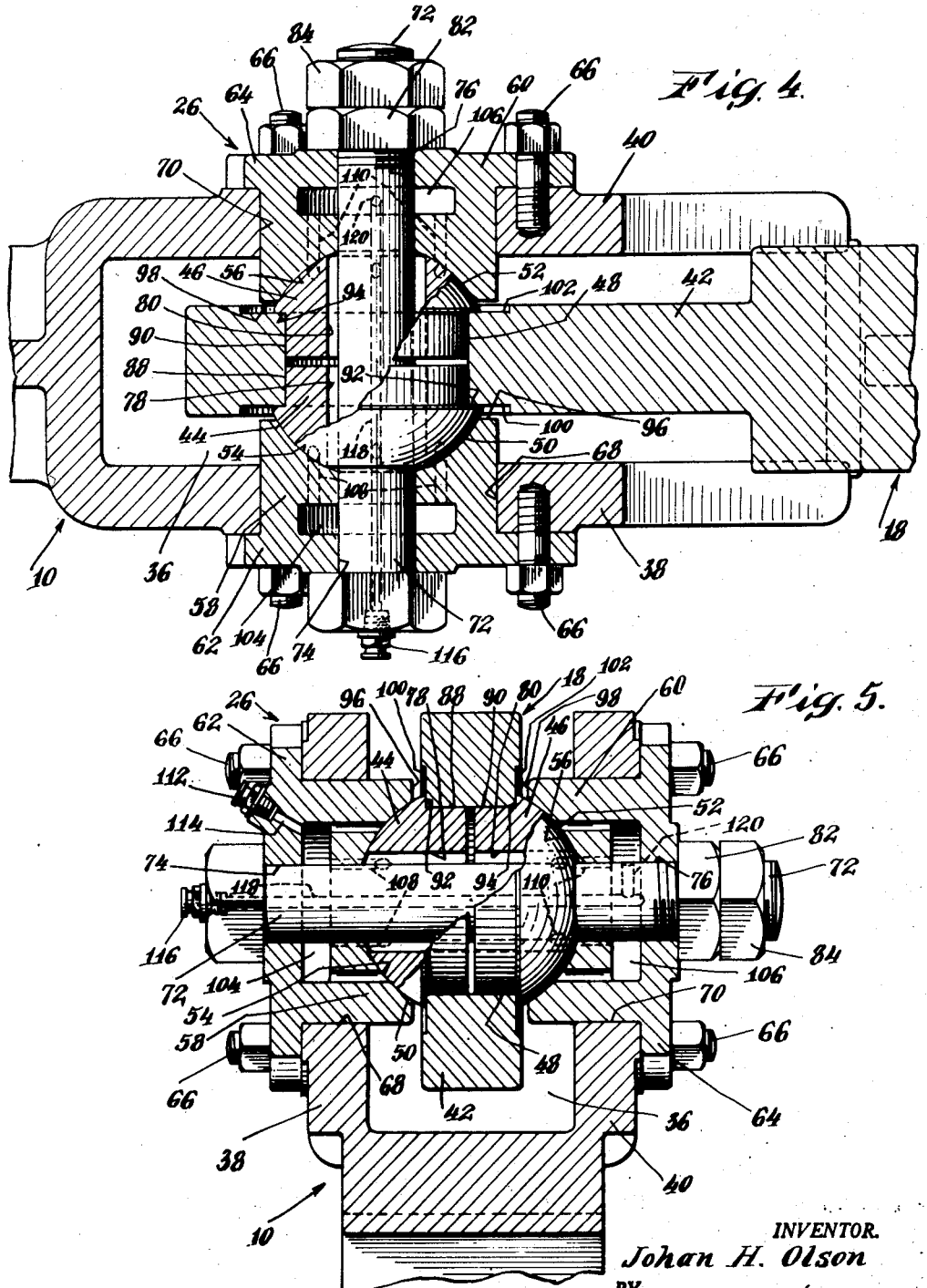

Patented May 19, 1953

2,639,173

UNITED STATES PATENT OFFICE 2,639,173

ARTICULATED TRUCK FOR RAILWAY CARS

Johan H. Olson, Larchmont, N. Y., assignor to M. H. Treadwell Company, Inc., New York, N. Y., a corporation of New York Application May 29, 1951, Serial No. 228,887

4 Claims. (Cl. 287—89)

This invention relates to railway car trucks which have six wheels and which, therefore, are articulated to enable the several wheels of the truck to adjust themselves to different angularities relatively to the car in a horizontal plane to yield smooth performance even when the car is negotiating curves of small radii. More particularly, this invention is directed to improvements in the means by which side frames of such trucks are articulated to permit relative angular movement of several parts of the truck in a horizontal plane as well as in a vertical plane.

The present invention probably can best be understood as an improvement upon the car truck invention disclosed in United States Patent No. 2,337,146, dated December 21, 1943, of which the present applicant was a co-inventor. That patent discloses very effective means for providing articulation between two side frame members of railway car trucks, but said means are not all that could be desired for assuring full freedom of relative angular movements of the articulated members in a horizontal plane when negotiating small radii curves or for effectively lubricating the articulation joint between such members.

Accordingly, the principal object of this invention is the provision of improved articulation means in railway car trucks to obviate the mentioned shortcomings of prior car truck structures. That and other objects are attained very effectively by the present invention of which a single embodiment is shown, for illustrative purposes, in the accompanying drawings without, however, limiting the invention to that particular embodiment.

Figure 2:
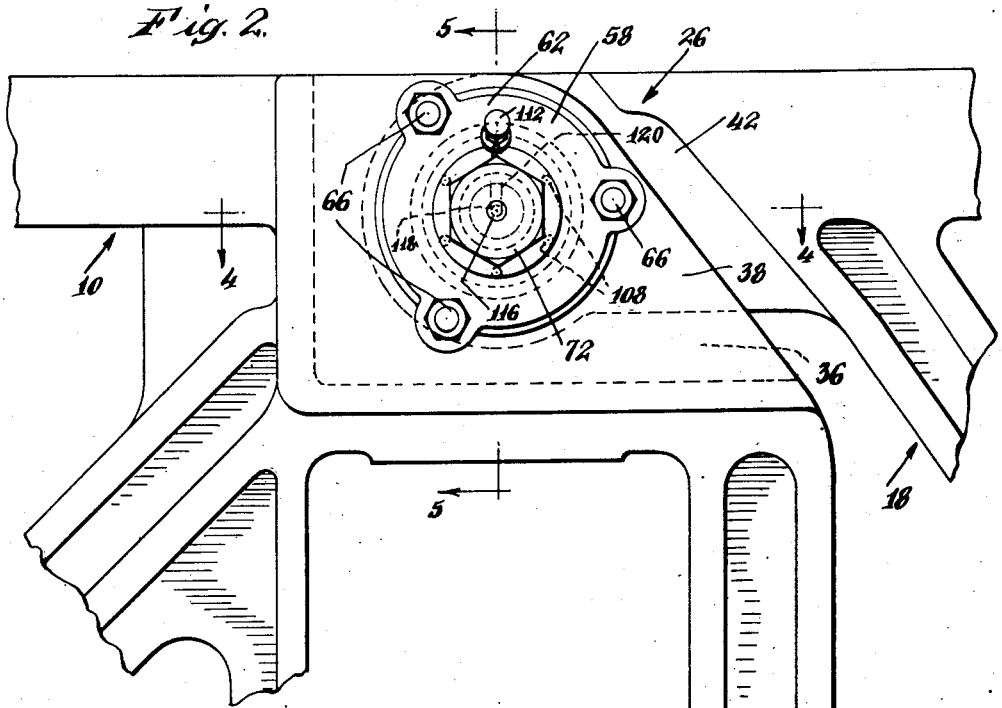
Fig. 2 is an enlarged fragmentary view of an articulated connection between portions of the truck shown in Fig. 1.
Figure 3:
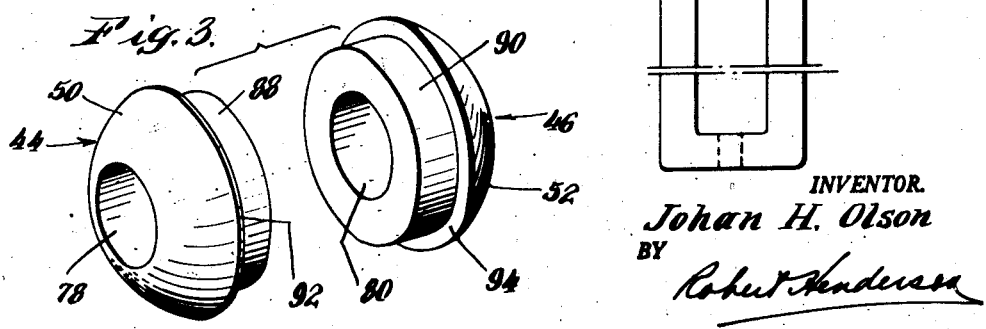
Fig. 3 is a perspective view of a pair of partially hemispherical elements constituting a part of a ball-and-socket joint provided in an articulated car truck according to this invention.

Fig. 4 is an enlarged, horizontal, transverse sectional view of a ball-and-socket articulation such as may be used in practicing the invention, the section being substantially on the line 4—4 of Fig. 2; and Fig. 5 is an enlarged, vertical, transverse sectional view of a ball-and-socket articulation such as may be used in practicing the present invention, the section being substantially on the line 5—5 of Fig. 2.

Figure 1:
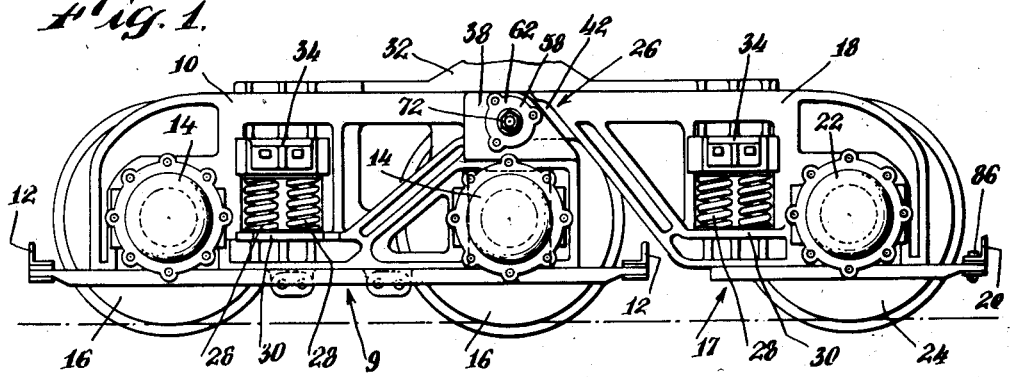
Figure 1 is a side elevational view of a six-wheel truck showing, in a general way, articulation means according to a preferred embodiment of the present invention.

The car truck illustrated in Fig. 1 includes a main truck assembly 9 comprising a side frame member 10 which is held in upright, parallel, rigid relationship to a similar opposite side frame member by plural cross members of which two such cross members 12 are shown. The frame member carries journal boxes 14 within which are carried the journals of four wheels 16 of the truck; only two of such wheels at the rear side of the truck being visible in the drawings.

The truck also includes a supplemental truck assembly 17 comprising a somewhat similar but smaller supplemental side frame member 18 which, like frame member 10, is somewhat rigidly tied to a similar opposite supplemental side frame member by plural cross members of which one is shown at 20. The frame member 18 carries a journal box 22 within which is carried the journal of a supplemental truck wheel 24. The side frame members 10 and 18 on each side of the truck are similarly interconnected by means of a pivot joint, generally identified at 26, which not only permits pivotal movement of the supplemental frame member 18 relatively to frame member 10 in a vertical plane, but also permits relative pivotal movement of the frame members 10 and 18 in a horizontal plane sufficiently to permit proper running of all wheels of the truck, even upon a curved track section having a short radius of curvature.

The opposite side frame members 10 and 18 of the two truck assemblies carry springs 28 which rest upon or seat within pads 30, and a bolster 32 which directly carries one end of a related car body has side extensions 34 which rest upon the springs 28 of the two truck assemblies to give some resiliency to the support afforded to the car body.

The joint 26 pivotally interconnects side frame members 10 and 18 through the medium of a ball-and-socket assembly disposed within an open pocket 36 defined by spaced vertical walls 38, 40 formed integrally with the side frame member 10 toward the top of the rearward end of the latter.

A tongue 42, formed integrally with the side frame member 18 toward the top of the front end of the latter, extends into the pocket 36 and is pivotally held therewithin by a pair of similar substantially hemispherical ball members 44, 46 which are press-fitted into opposite ends of a transverse bore 48 provided in the tongue 42 near the latter's end and have convex outer surfaces 50, 52 which seat accurately within complemental concave inner surfaces 54, 56 of somewhat similar socket members 58, 60 which are formed with flat external flanges 62, 64 by which they are held by bolts 66 within opposed coaxial bores 68, 70 in the walls 38, 40.

A stout bolt or pin 72 extends with a substantially accurate fit through bores 74, 76 in the socket members 58, 60, the intermediate or shank portion of said bolt extending within similar transverse bores 78, 80 in the two ball members 44, 46. The head of the pin 72 bears against the outer face of socket member 58, and a nut 82 on the inner end of the pin 72 and held against accidental dislodgment therefrom by a lock-nut 84 bears against the outer face of socket member 60, so that said pin very effectively opposes any tendency of the walls 38, 40 to spread apart and become damaged or broken by wedging action of the ball members 44, 46 within their related socket members.

It should be obvious that in the described arrangement the supplemental truck assembly 17 is free to pivot in a vertical plane relatively to the main truck assembly 9. In addition, the two mentioned truck assemblies are capable of a slight, but nevertheless adequate, pivotal motion relatively to each other in a horizontal plane, so that all the wheels of the entire truck assembly may ride smoothly and without excessive frictional engagement around curved track sections even of a relatively short radius of curvature. To enhance such horizontal planar pivoting of the two truck assemblies without subjecting the pin 72 to damage, the bores 78, 80 in the two ball members are appreciably larger in diameter than the pin 72 which extends therethrough. Thus, as may best be understood from Fig. 4, any horizontal pivotal movement of the ball members 44, 46 within the relatively narrow limits which could occur even when negotiating curves of sharp curvature would not bring any surface of either of said bores into contact with the pin 72, so that such pivotal movement could not possibly cause any damage to the pin.

If the supplemental truck assembly 17 were absolutely rigid, the mentioned horizontal pivotal movement of that assembly could not occur inasmuch as it is pivoted to the main truck assembly 9 at two separate points at opposite sides of the truck. However, the said truck assembly is not absolutely rigid, not only because the supplemental side frame members 18 may possess some slight resiliency but also because the cross members of the supplemental truck assembly, such as member 20, for example, are not rigidly fixed to the two side frame members 18, but, instead, are secured at their ends to said side frame members by pins or bolts of which one is shown at 86 in Fig. 1. Thus, there is a permissible, although very slight, pivotal movement of the cross members 20 relatively to the side frame members 18 so that, when negotiating a curve, the supplemental truck assembly, as viewed from above, departs slightly from a true rectangular shape and assumes an almost imperceptible oblique parallelogram shape. By this arrangement, horizontal pivotal movement is permitted at the two ball-and-socket joints, thereby enabling the wheels of the supplemental truck assembly to track smoothly upon their supporting rails. For somewhat similar reasons, the main truck assembly 9 is slightly flexible to permit the wheels of that assembly also to track freely upon their supporting rails.

By providing a two-part ball assembly for the ball-and-socket joints, those two parts may be pressed into place in the bore 48 of the tongue 42 from opposite sides of the latter in the manner already described; hence, it becomes entirely feasible to form the two ball members with outer cylindrical surfaces 88, 90 which fit tightly within the mentioned bore 48, and to terminate those cylindrical surfaces at flat annular shoulders 92, 94, the outer edges of which may be slightly chamfered but otherwise adjoin the convex surfaces 50, 52 of the two ball members.

When the two ball members are assembled in the joint, as shown in Figs. 4 and 5, the shoulders 92, 94 serve as positive means for maintaining the tongue 42 always centered with respect to the ball assembly. Thus, said tongue 42 cannot slide sidewisely on the ball assembly into engagement with either of the socket members 58, 60, which condition of course would interfere with free swiveling of said tongue and its related supplemental truck assembly. This centering of tongue 42, coupled with the fact that said tongue is so dimensioned that it is clear of adjacent inner edge faces 96, 98 of socket members 58, 60, and with the further fact that the tongue is annularly recessed as at 100, 102 about opposite ends of the bore 48, establishes a very adequate clearance between the tongue and the socket members to avoid any possible interference therebetween in any horizontal pivoting action of the supplemental truck assembly which may take place when negotiating a curve even of an extremely small radius of curvature.

As it is important to minimize wear at the ball-and-socket joints and thus avoid the development of looseness therein, very effective means are provided for lubricating the joints. To that end, the socket members 58, 60 are similarly formed with internal annular recesses 104, 106 which communicate through axial bores 108, 110 with the concave inner surfaces 54, 56 of the socket members. These bores open at portions of the surfaces 54, 56 which are in sliding contact with the spherical surfaces 50, 52 of the ball members, so that the said sliding contacting surfaces may be well lubricated by lubricant conducted through the bores 108 and 110 from the annular recesses 104 and 106.

Lubricant may be introduced into recess 104 through a lubricant connection 112 and a duct 114 drilled or otherwise formed in the outer wall of socket member 58, and lubricant may be introduced into recess 106 through a lubricant connection 116 and an axial bore 118 in the bolt or pin 72 which communicates with the latter recess through a radial bore 120 in said bolt or pin. The ball-and-socket joint is very adequately lubricated by the means just described.

It will be understood that, to pivotally connect the supplemental truck assembly to the main truck assembly, the tongues 42 at opposite sides of the former assembly are first moved into place within the pockets 36 at opposite sides of the latter assembly. Then the ball-and-socket joints interconnecting the two sides of the two truck assemblies may be similarly assembled by first passing the ball members 44, 46 through the then unoccupied bores 68, 70 in the walls 38, 40 and pressing said ball members into place within the transverse bore 48 in the tongue 42. The socket members 58, 60 are then inserted into the bores 68, 70 and anchored in place by the bolts 66. Thereafter the bolt or pin 72 is inserted through the several socket and ball members and the nuts 82, 84 are then applied and tightened and locked in place. It should be apparent that assembly and disassembly of the ball-and-socket joints for maintenance or other purposes is a very simple matter.

Although articulated trucks according to the present invention are particularly useful in so-called "hot metal cars" as mentioned in United States Patent No. 2,337,146, to which reference has hereinbefore been made, nevertheless it should be understood that trucks according to this invention are useful also in other track-borne cars.

It should also be understood that the present invention may comprise components somewhat different than those described and illustrated in this application and that such variations may be made without, however, departing from the invention as set forth in the following claims.

I claim:

1. In an articulated truck, articulation means for pivotally interconnecting two side frames comprising a pair of spaced walls defining an open pocket in one of said frames and being formed with opposed side openings, a tongue portion of the other frame extending into said pocket and formed with a transverse bore substantially coaxial with said side openings, a pair of substantially similar ball members having inner cylindrical extensions disposed oppositely within said transverse bore and radially outwardly extending shoulders defining the outer ends of said extensions and coacting with the sides of the tongue to limit the extension of said extensions into said transverse bore and to prevent translatory movement of the tongue portion relatively to the pair of ball members, and a pair of socket members removably disposed fixedly within said openings and having inwardly facing concave spherical surfaces in engagement with convex spherical surfaces on said ball members; the said tongue portion being of less thickness than the space between the said two walls to permit pivotal movement of the two frames laterally in relation to each other, and the said side openings being larger than said ball members whereby to enable the latter to be passed separately through the opposite said side openings into their stated association with the tongue during assembly.

2. In an articulated truck, articulation means according to claim 1, further characterized in that the said ball members are formed with coaxial bores and in further including a pin extending through said bores and interconnecting said socket members to prevent movement of the latter away from each other; the said bores in the ball members being of materially greater diameter than said pin whereby to permit pivotal movement of said ball members relatively to said socket members in an axial plane without interference between the pin and the ball members.

3. In an articulated truck, articulation means according to claim 1, further characterized in that each of said socket members is formed with an inner recess for holding fluid lubricant and at least one axial passage affords fluid communication between said recess and said concave surfaces of the socket member.

4. In an articulated truck, articulation means according to claim 1, further characterized in that the said ball members and at least the socket associated with one of said walls are formed with coaxial bores and in further including a pin extending through said bores and coacting with said socket members of both walls to prevent movement of said walls away from each other; the socket associated with each of said walls being formed with an inner annular recess for holding fluid lubricant and plural axial passages affording fluid communication between said recess and said concave surfaces of the same socket, the socket associated with one wall being formed with a passage affording fluid communication between its said recess and its exterior and the pin being formed with a passage affording fluid communication between the said recess of the socket member associated with the other wall and the exterior of the pin at one end thereof.

JOHAN H. OLSON.

References Cited in the file of this patent

UNITED STATES PATENTS

| Number | Name | Date |
|---|---|---|
| 1,409,007 | Johnston | Mar. 7, 1922 |
| 1,625,656 | Harwick | Apr. 19, 1927 |
| 1,933,909 | Huddle | Nov. 7, 1933 |
| 2,013,546 | Wallace | Sept. 3, 1935 |
| 2,337,146 | Astrom et al. | Dec. 21, 1943 |